United States Patent [19]
Raffini

[11] Patent Number: 5,556,162
[45] Date of Patent: Sep. 17, 1996

[54] CHILD SEAT PROTECTION DEVICE

[76] Inventor: Roger A. Raffini, 10 Sunset Hill Rd., Georgetown, Conn. 06829

[21] Appl. No.: 523,468

[22] Filed: Sep. 5, 1995

[51] Int. Cl.⁶ .................................................. A47C 1/08
[52] U.S. Cl. .............................. 297/256.15; 297/216.11; 297/488
[58] Field of Search ........................ 297/256.15, 256.16, 297/250.1, 488, 487, 130, 216.1, 216.11, 184.13, 184.11, 184.1, 118

[56] References Cited

U.S. PATENT DOCUMENTS

| | | |
|---|---|---|
| D. 330,528 | 10/1992 | Allen et al. . |
| 2,649,893 | 8/1953 | Spriggs ............................... 297/487 X |
| 3,583,761 | 6/1971 | Hume et al. ......................... 297/488 X |
| 3,829,113 | 8/1974 | Epelbaum . |
| 4,456,302 | 6/1984 | Knoedler et al. ....................... 297/488 |
| 4,620,711 | 11/1986 | Dick ................................... 297/130 X |
| 4,685,688 | 8/1987 | Edwards . |
| 4,786,064 | 11/1988 | Baghdasarian ....................... 297/130 X |
| 4,790,593 | 12/1988 | Davalos et al. . |
| 4,874,182 | 10/1989 | Clark ........................................ 297/130 |
| 4,989,888 | 2/1991 | Qureshi et al. . |
| 5,133,567 | 7/1992 | Owens . |
| 5,265,931 | 11/1993 | Ryan . |
| 5,332,285 | 7/1994 | Sinnhuber . |
| 5,332,292 | 7/1994 | Price et al. . |
| 5,360,221 | 11/1994 | Chai . |
| 5,385,386 | 1/1995 | Beamish et al. .................... 297/256.16 |
| 5,431,478 | 7/1995 | Noonan ............................... 297/256.16 |

*Primary Examiner*—Milton Nelson Jr.
*Attorney, Agent, or Firm*—Richard C. Litman

[57] ABSTRACT

A portable framework providing protection to a space surrounding a seat for an infant. The framework extends in all directions beyond a child situated in the seat to prevent threats from impacting the child directly. The seat may be conveniently mounted within the framework. The framework may then be easily placed in an automobile seat so that the seat may be used as a car seat. Alternatively, the framework may be connected to a stroller chassis to form a carriage. The framework is formed of a number of lightweight strong bars arranged at angles and with curves to cause potential hazards to be easily deflected from the structure. The framework includes a front portion which pivots to assist in introducing and removing a child from the seat.

12 Claims, 4 Drawing Sheets

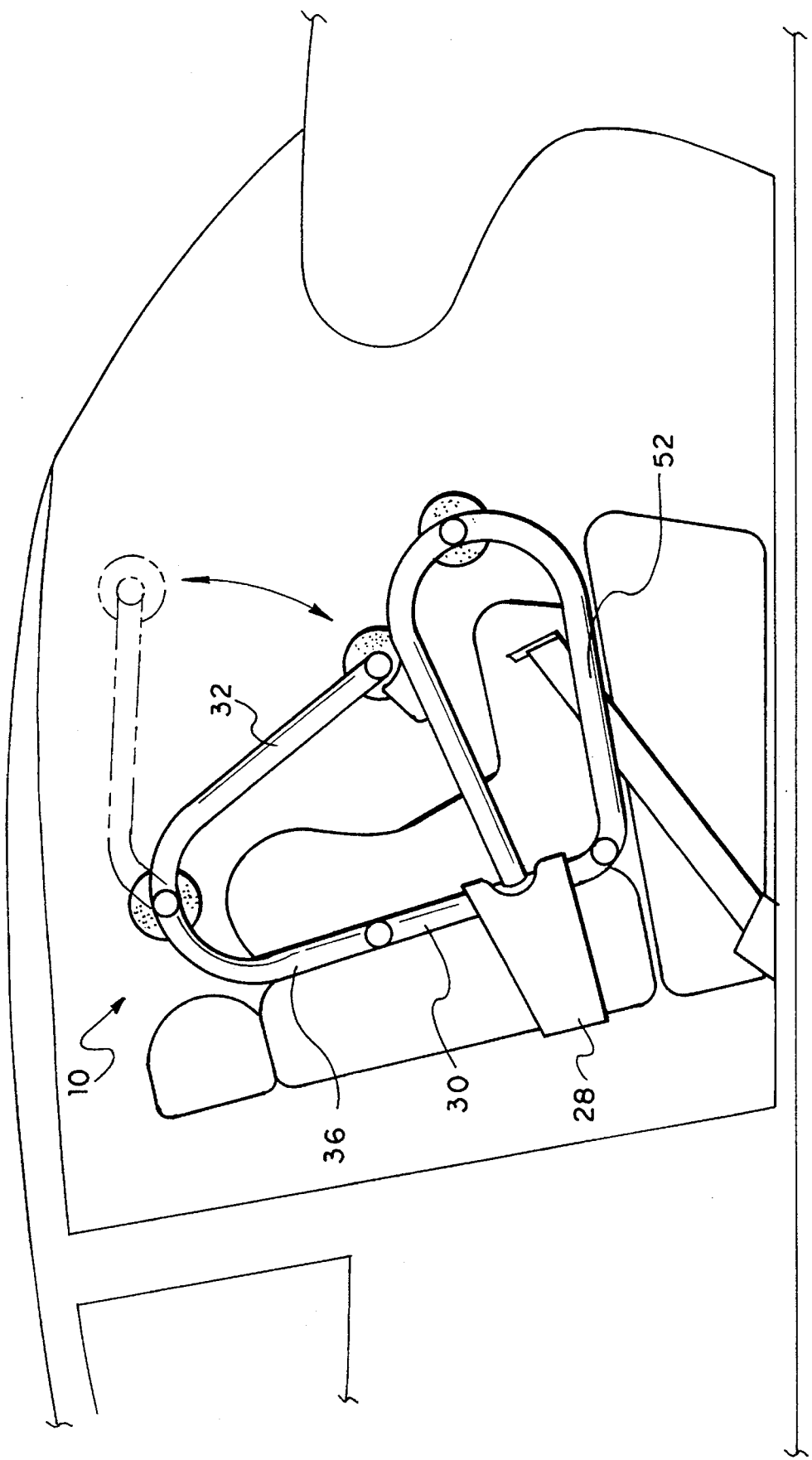

CHILD SEAT PROTECTION DEVICE

BACKGROUND OF THE INVENTION

1. Field of the Invention

The present invention relates to child protection devices. In particular the invention relates to a framework surrounding a child as a deterrent to harm becoming a child when restrained in a child seat.

2. Description of the Prior Art

As it often has become required for infants to be secured in a child seat during automobile travel, the use of child seats has become widespread. Therefore, many parents and guardians have acquired a child seat. These parent and guardians and have found various situations, outside of automobiles, favorable for using the child seat. Devices have, thus, been developed to improve the versatility of child seats. These devices may be incorporated in the seat or used in conjunction with the seat. Many of these improvements allow a child seat to be used as a stroller. Examples of such devices include: U.S. Pat. No. 3,829,113, issued Aug. 13, 1974, to Q. C. Epelbaum; U.S. Pat. No. 4,685,688, issued Aug. 11, 1987, to G. S. Edwards; U.S. Pat. No. 4,989,888, issued Feb. 5, 1991, to K. A. Qureshi et al.; U.S. Pat. No. 5,133,567, issued Jul. 28, 1992, to V. Owens; U.S. Pat. No. 5,360,221, issued Nov. 1, 1994, to Y. S. Chai; and U.S. Pat. No. Des. 330,528, issued Oct. 27, 1992 to S. Allen et al. None of the above devices include a framework for protecting a child which extends beyond the child in all directions, especially in the front where a child's vital parts are most exposed. Frames used in conjunction with child seats are shown in U.S. Pat. No. 5,265,931, issued Nov. 30, 1993, to S. E. Ryan which shows a child seat designed to be used in conjunction with a variety of frames. Also showing a frame used to secure a child seat in automobile seat is U.S. Pat. No. 5,332,285, issued Jul. 26, 1994, to R. Sinnhuber. Again these devices do not provide a frame surrounding a child in the seat. Devices which are designed to at least partially surround the occupant to provide protection include U.S. Pat. No. 4,790,593, issued Dec. 13, 1988, to M. R. Davalos et al. which shows a device used to protect an occupant of a vehicle. The Davalos device may be used with child seat but does not surround the child seat. Similarly, U.S. Pat. No. 5,332,292, issued Jul. 26, 1994, to P. A. Price et al. shows a protective cushion arrangement for a toddler's car seat. Again the Price device does not surround the child seat. None of the above inventions and patents, taken either singly or in combination, is seen to describe the instant invention as claimed.

SUMMARY OF THE INVENTION

As the versatility of child seats have improved, it has become more convenient to take infants into less protected environments. The present invention provides supplemental protection to a child in a child seat, therefore providing security to the child in these less protected environments.

Most child seats are designed to restrain a child in the event of a collision in a motor vehicle. Therefore, a child seat may not adequately protect a restrained child from objects which may impact upon the seat. A child seat may also provide deficient protection to a restrained child if the child seat becomes loose in an automobile accident. The instant invention comprises a roll bar framework surrounding the full volume of space used by a child in a child seat. The framework protects the child from potential hazards which may impact the framework. The security of a restrained child is also increased in the event the child seat itself impacts upon another object as may occur if the child seat was dropped in a dangerous environment such as a flight of stairs. The framework of the invention surrounds a child seat to provide greatly increased protection to a child secured within the seat.

The invention comprises a strong lightweight framework which surrounds a child seat and, thus, shields the child restrained in the child seat. The framework extends, in all directions, beyond the child positioned in the child seat. The framework comprises two side frames connected by a series of strong bars. The two side frames are formed in the approximate shape of an exaggerated side of a traditional child seat. The connecting bars are arranged to allow a child seat to be securely attached within the framework and to provide maximum convenience and protection to the child. Strong lightweight materials are used to protect the maximum volume with the minimum weight and materials. Padded bars are positioned in front of the child to protect the particularly vulnerable head and vital organs of the child from potential hazards which may approach from the front. The top of the framework includes a pivot to allow a front section to swing open, providing simple access to a child within the framework. The framework is portable, as young children are small enough so that one may engineer a frame to surround a young child, that is substantial, yet easily handled. The framework can also be configured to be attachable to a stroller chassis to form a protected carriage. The framework is designed with slanted bars and curved corners to cause potential hazards to deflect or roll from the frame. These features also allow the frame itself to roll and deflect from objects it may strike.

Accordingly, it is a principal object of the invention to provide a protective framework surrounding a child within a child seat.

It is another object of the invention to provide a framework extending across the front of a child in a child seat.

It is a further object of the invention to provide a pivot in the top of the framework to allow a front section of the frame to swing open for interior access.

Still another object of the invention is to provide portable framework which may be used in conjunction with a child seat in an automobile and may alternatively be used with a stroller chassis to from a stroller.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 4 is a side environmental view showing the framework of FIG. 1 placed in an automobile seat.

Similar reference characters denote corresponding features consistently throughout the attached drawings.

DETAILED DESCRIPTION OF THE PREFERRED EMBODIMENTS

Figure 1:
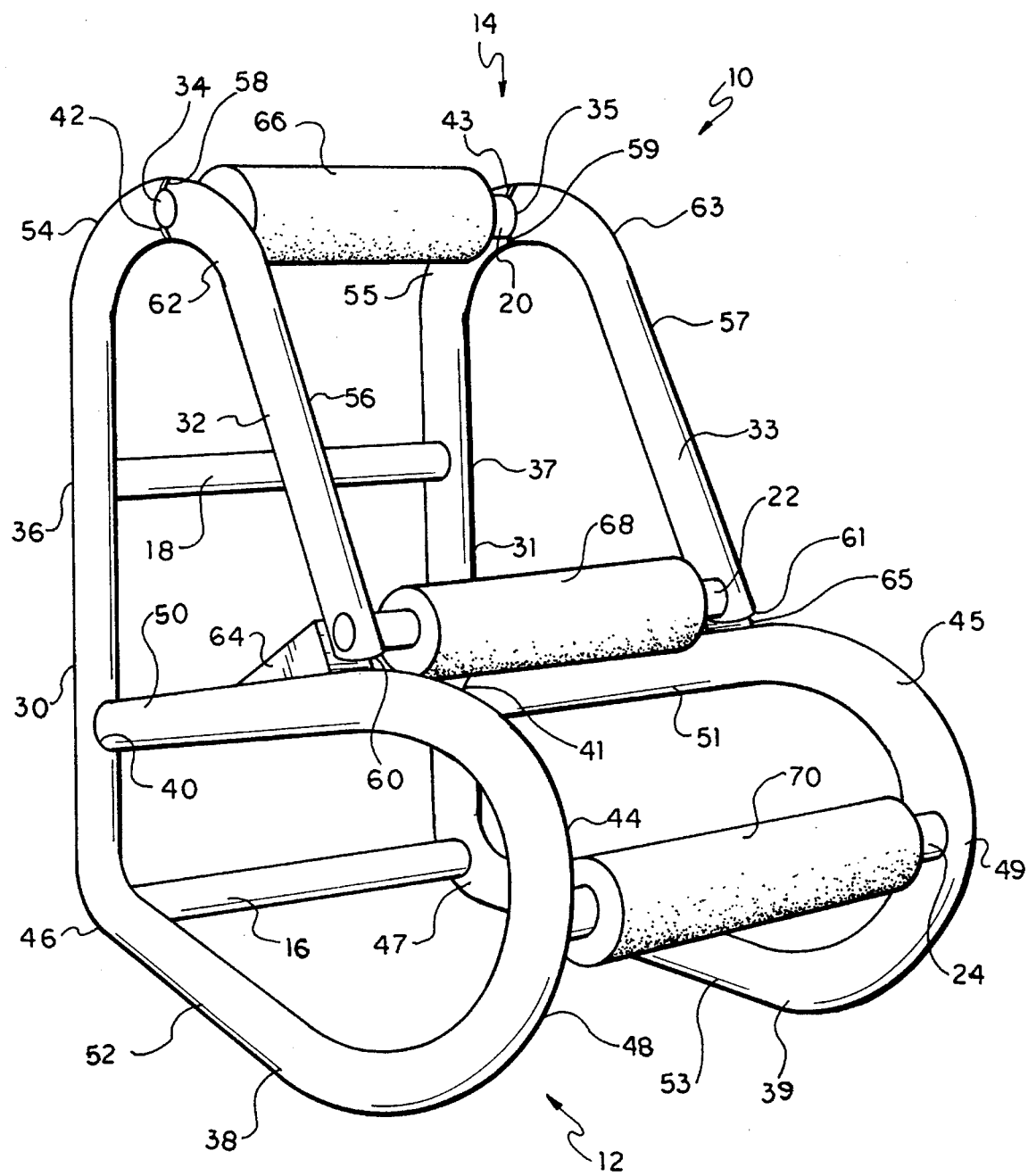
FIG. 1 a perspective view of the child seat protection framework of the present invention.

A preferred embodiment of the child protection device of the present invention is shown in FIG. 1. The child protection device comprises framework 10. Included in the framework 10 is right side piece 12, left side piece 14, and a plurality of crossbars 16 through 24. Left side piece 14 is identical in shape to right side piece 12. Side pieces 12 and 14 are constructed from a lightweight material such as a rigid plastic or aluminum or other metal tubing. Each side piece is formed from a primary member 30 or 31 hingedly attached to a secondary member 32 or 33 at pivot 34 or 35. Each side piece 12 or 14 is formed as a planar shape so that the sides of framework 10 are flat.

Figure 2:
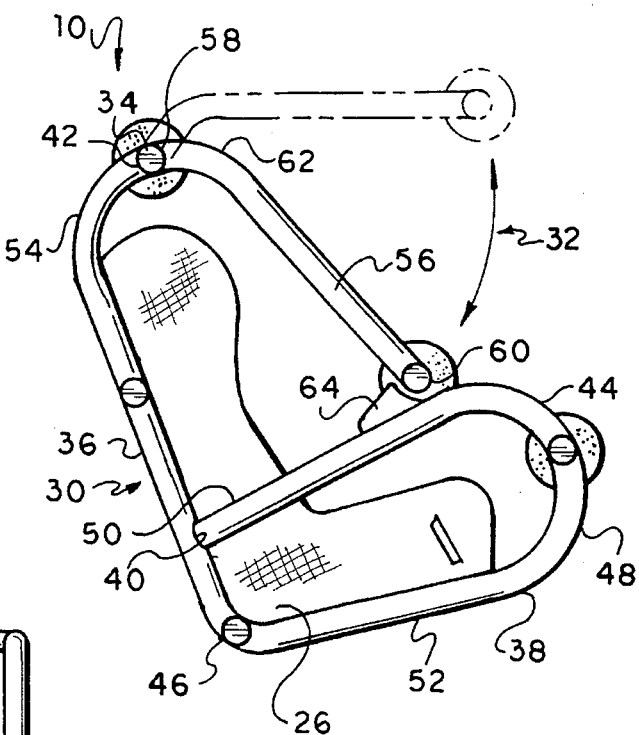
FIG. 2 is a side elevation view of the framework of FIG. 1 showing a child seat mounted therein.
Figure 3:
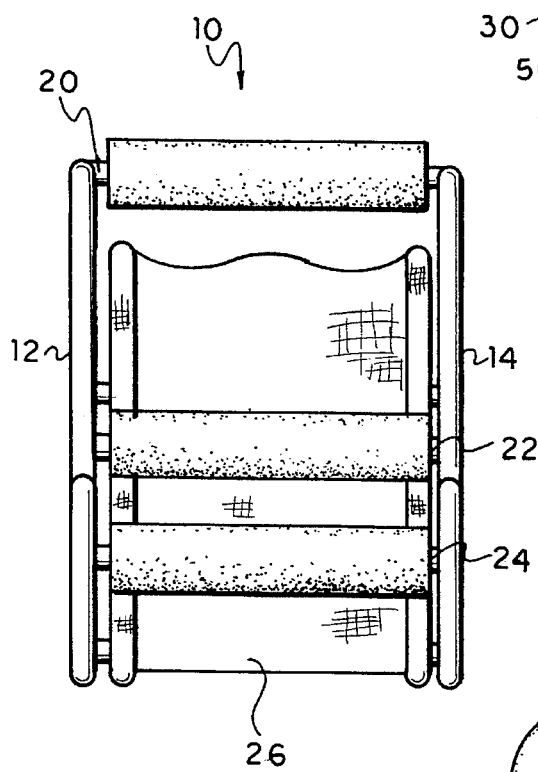
FIG. 3 is a front elevation view of the framework of FIG. 1 also showing a child seat mounted therein.

As shown in FIG. 3, side pieces 12 and 14 guard against potential hazards from the sides of child seat 26. The side pieces are spaced apart by plurality of crossbars 18 through 24 so that sidepieces 12 and 14 may envelop the sides of child seat 26. To provide protection from hazards in all directions the planar shape of side pieces 12 and 14 approximates an enlarged side of a common child seat. As shown in FIG. 2, this shape includes various curves and angles which give strength to the framework 10 and cause potential hazards which may impact on framework 10 to deflect or roll from the device. The shape is devoid of dangerous sharp corners which are weaker than the curved corners employed. The shape also allows framework 10 to deflect or roll from potential hazards the device may encounter if it should be propelled in the event of an accident.

Each primary member 30 and 31 has a first end 40 or 41 and a second end 42 or 43 and includes a back portion 36 or 37 which is substantially straight, and a bottom portion 38 or 39. First end 40 or 41 is attached to back portion 36 or 37 to form a loop 44 or 45 in bottom portion 38 or 39. Loop 44 or 45 is formed with a curved corner 46 or 47 below first end 40 or 41 and a curved forepart 48 or 49 opposite curved corner 46 or 47. Bottom portion 38 or 39 also includes a straight top segment 50 or 51 connected perpendicularly to back portion 36 or 37 at first end 40 or 41 to curved forepart 48 or 49, and a straight bottom segment 52 or 53 connecting curved corner 46 or 47 to curved forepart 48 or 49. Curved forepart 48 or 49 has a large radius of curvature with respect to said curved corner 46 or 47 to provide protection to lower body and legs of a child in child seat 26. Curved corner 46 or 47 maintains, between back portion 36 or 37 and bottom segment 52 or 53, an obtuse angle which approximates the typical angle between child seat backs and bottoms. This configuration is convenient as bottom segments 52 and 53 form a bottom for supporting framework 10. Also, back portions 36 and 37 fit well against the back of an automobile seat as is shown in FIG. 4. Framework 10 may also include means for attaching the framework 28 securely within the automobile.

Returning to FIG. 2, at the top of back portion 36 or 37 is a curved back top portion 54 or 55 which terminates at second end 42 or 43. Extending in front and above a child in child seat 26 are secondary members 32 and 33 which protect the face and body of the child from potential hazards which may approach the child from the front. Secondary members 32 and 33 each have a top end 58 or 59 and a bottom end 60 or 61 and include a straight front portion 56 or 57. Above straight front portion 56 or 57 is a curved front top portion 62 or 63. Curved front top portion 62 or 63 terminates at top end 58 or 59 and straight front portion 56 or 57 terminates at bottom end 60 or 61. Pivot 34 or 35 connects curved front top portion 62 or 63 with curved back top portion 54 or 55 to form a curved top portion which extends above the top of child seat 26 to protect the head a child within child seat 26.

Pivot 34 and 35 allows secondary members 32 and 33 to be rotated up and away from the front of child seat 26 to provide access to the interior of framework 10 and to child seat 26. The bottom end 60 or 61 of secondary member 32 or 33 rests against a stop 64 or 65 which is mounted on the top of top segment 50 or 51 near curved forepart 48 or 49. The stops 64 and 65 have generally triangular shapes and prevent bottom ends 60 and 61 from nearing back portions 36 and 37. Stops 64 and 65, therefore, hold secondary members 32 and 33 in a position to resist frontal impacts to framework 10. Simple latches may be included in stops 64 and 65 to secure secondary members 56 and 57 in a closed position.

Figure 6:
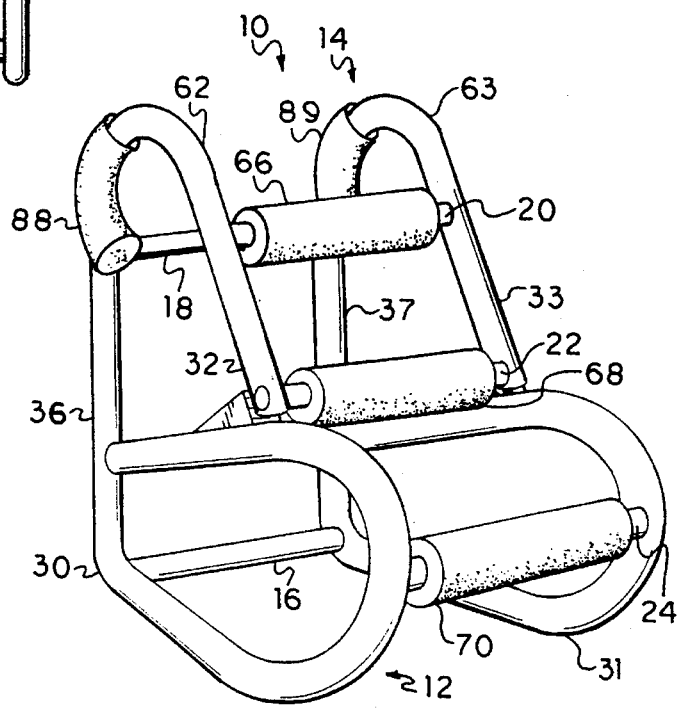
FIG. 6 is a perspective view of an alternate embodiment of the child seat protection framework of the present invention showing an alternate pivot configuration.

The crossbars 16 through 24 connect left side piece 12 with right side piece 14. Crossbars 16 through 24 are generally horizontal and may have a slightly smaller diameter than side pieces 12 and 14. The plurality of crossbars also provides structure to which seat 26 is secured. Means such as mechanical fasteners or bolts semi-permanently attach seat 26 to framework 10. The attachment arrangement provides a secure connection between the seat 26 and the framework 10 while allowing detachment for replacement or cleaning. As shown in FIG. 1, in the preferred embodiment there are five crossbars. Crossbar 16 connects right curved corner 46 with left curved corner 47. Crossbar 18 connects right back portion 36 with left back portion 37. Crossbar 20 connects right curved back top portion 54 with left curved back top portion 55. Crossbar 22 connects right bottom end 60 with left bottom end 61. Crossbar 24 connects right curved forepart 48 with left curved forepart 49. The crossbars may occupy other positions in other embodiments, as shown in FIG. 6, as long as the crossbars are distributed around the interior of framework 10. The crossbars 20, 22, and 24 in front of child seat 26, which may come in contact with the child, may be encircled with cylindrical pads 66, 68, and 70.

Figure 5:
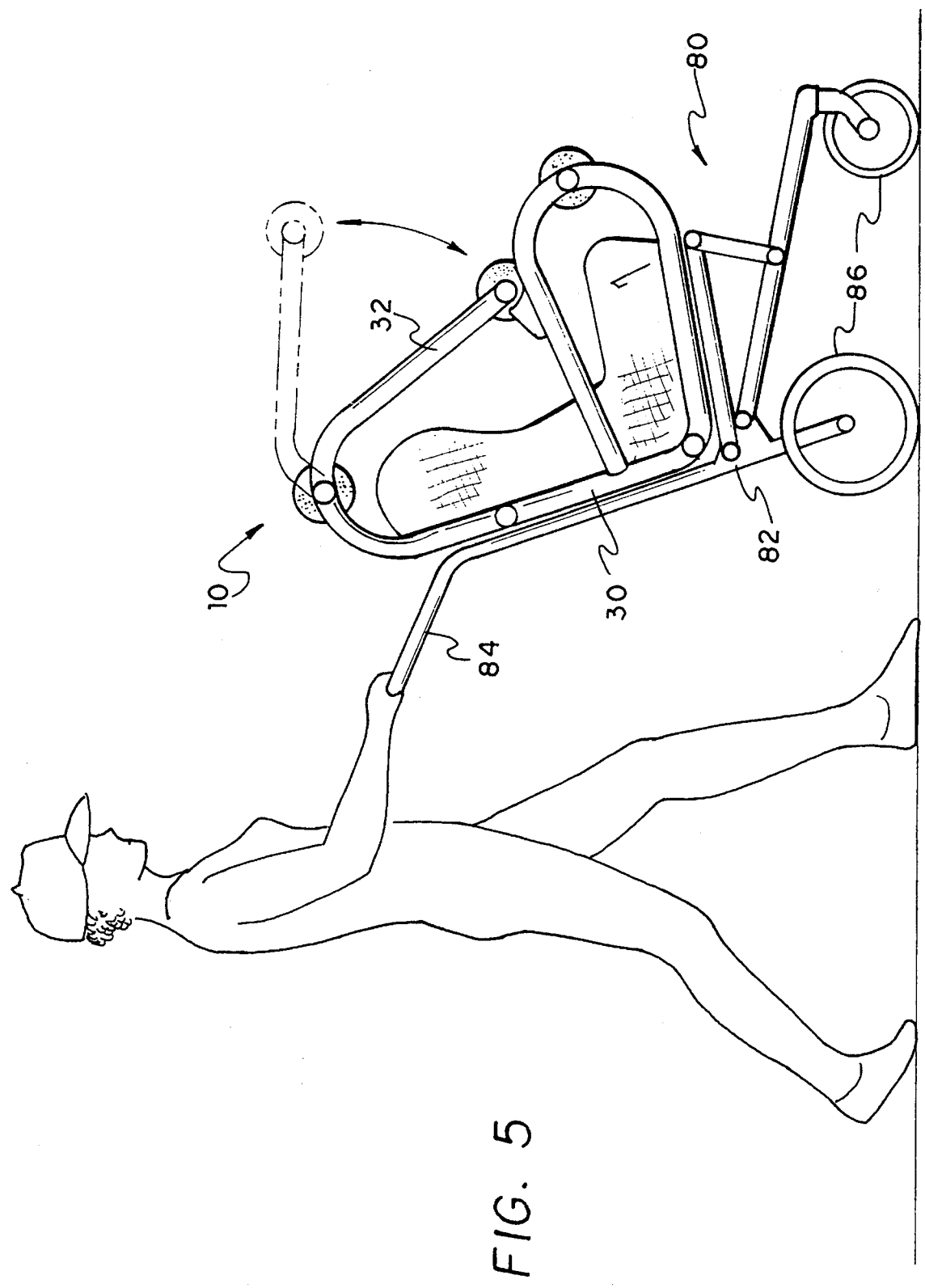
FIG. 5 is a side environmental view showing the framework of FIG. 1 placed on a stroller chassis.

FIG. 5 shows framework 10 mounted on a stroller chassis 80. Stroller chassis is a lightweight wheeled apparatus which may be constructed of materials similar to the framework 10. Stroller chassis 80 includes a collapsible body 82 including handle 84 for guiding the assembly. Body 82 is supported by wheels 86. Body 82 is foldable for convenient storage in locations such as the trunk of an automobile. Framework 10 may be temporarily secured to stroller chassis 80 to form a protective child stroller.

FIG. 6, shows an embodiment of framework 10 having an alternate pivot. In place of the curved back top portions 54 and 55 and the pivot 34 and 35 located above back portions 36 and 37 in FIG. 1 are rigid arcuate tubes 88 and 89 of ample diameter to accept curved front top portions 62 and 63. Top portions 62 and 63 are extended in an arcuate configuration of similar radius to tubes 88 and 89 such that top portions 62 and 63 may slide within arcuate tubes 88 and 89. Top ends 58 and 59 may extend sufficiently into tubes 88 and 89 in the closed position, as shown, to prevent separation of secondary members 32 and 33 from primary members 30 and 31.

It is to be understood that the present invention is not limited solely to the embodiments described above, but encompasses any and all embodiments within the scope of the following claims.

I claim:

1. A child protection device for shielding space surrounding a child seat, the device comprising:
   a left side piece and a right side piece, each said side piece including,
      a primary member having a bottom portion in the form of a loop and a back portion terminating at a top portion,
      a secondary member having a top end and a bottom end,
      a pivot attaching said top portion of said back portion to said top end of said secondary member, and
      stop means disposed on said primary member, said stop means engagable with said secondary member; and
   a plurality of crossbars connecting said left side piece to said right side piece to form a framework defining an interior space, said stop means preventing said secondary members from entering the interior space; whereby said framework provides protection to a child restrained in a child seat within the interior space.

2. The child protection device according to claim 1, wherein the pivot comprises,
   an arcuate tube attached to said primary member, and
   an arcuate extension protruding from said secondary member, wherein said arcuate extension is disposed within said arcuate tube.

3. The child protection device according to claim 1, wherein said left and right side pieces have planar shapes which include curved corners.

4. The child protection device according to claim 1, wherein at least one of said crossbars is padded.

5. The child protection device according to claim 1, wherein said pivot allows said secondary members to rotate outward and upward to provide interior access to said framework.

6. The child protection device according to claim 1, further comprising a collapsible stroller chassis removably attachable to the framework to form a stroller frame.

7. The child protection device according to claim 1, further comprising means for securing the child seat within said framework.

8. The child protection device according to claim 7, wherein the child seat 10 secured within said framework.

9. The child protection device according to claim 7, wherein said plurality of crossbars includes a plurality of padded crossbars.

10. A protective device for surrounding a child in a child seat, the device comprising: a framework defining an interior space, said framework including;
    a right side part and a left side part, each said side part including,
       a primary tubular member having a first end and a second end, said primary member forming a planar shape, said shape including a straight back portion and a bottom portion, said first end attached to said back portion to form a loop in said bottom portion, said loop including a curved corner below said first end and a curved forepart opposite said curved corner, said bottom portion further including a straight top segment connecting said curved forepart to said first end and a straight bottom segment connecting said curved forepart to said curved corner, said curved corner maintaining an obtuse angle between said straight back portion and said straight bottom segment, said straight back portion connecting said curved corner with a curved back top portion, and said curved back top portion terminating at said second end,
       a secondary tubular member having a top end and a bottom end, said secondary member forming a straight front portion below a curved front top portion, said straight front portion terminating at said bottom end, said curved front top portion terminating at said top end, said curved front top portion pivotally attached to said curved back top portion of said primary member, and
       a triangular stop projecting from said straight top segment of said primary member, said triangular stop preventing said bottom end of said secondary member from nearing said straight back portion of said primary member;
    a first straight tubular crossbar connecting said curved corner of said right side part with said curved corner of said left side part;
    a second straight tubular crossbar connecting said straight back portion of said right side part with said straight back portion of said left side part;
    a third straight tubular crossbar connecting said curved back top portion of said right side part with said curved back top portion of said left side part, said third straight tubular crossbar encircled by a cylindrical pad;
    a fourth straight tubular crossbar connecting said bottom end of said right side part with said bottom end of said left side part, said fourth straight tubular crossbar encircled by a cylindrical pad; and
    a fifth straight tubular crossbar connecting said forepart of said right side part with said forepart of said left side part, said fifth straight tubular crossbar encircled by a cylindrical pad.

11. The protective device according to claim 10, further comprising a child seat semi-permanently secured within said framework.

12. The protective device according to claim 11, further comprising a collapsible stroller chassis removably attachable to said framework.

* * * * *